United States Patent
Sakamoto et al.

[11] Patent Number: 5,903,078
[45] Date of Patent: May 11, 1999

[54] ROTARY POLYGON MIRROR MOTOR

[75] Inventors: Junshin Sakamoto; Kenichi Kugai, both of Ibaraki, Japan

[73] Assignee: Hitachi Koki Co., Ltd., Tokyo, Japan

[21] Appl. No.: 08/938,563

[22] Filed: Sep. 26, 1997

[30] Foreign Application Priority Data

Sep. 27, 1996 [JP] Japan ................................. 8-255963

[51] Int. Cl.$^6$ ........................... H02K 7/09; H02K 21/12; H02K 1/22
[52] U.S. Cl. ......................... 310/90.5; 310/156; 310/261
[58] Field of Search ................... 310/154, 90.5, 310/156, 152, 90, 261, 262

[56] References Cited

U.S. PATENT DOCUMENTS 5,142,176  8/1992  Takahashi ........................... 310/90.5
5,289,067  2/1994  Takana et al. ....................... 310/90.5

*Primary Examiner*—Nestor Ramirez
*Assistant Examiner*—Dane Dinh Le
*Attorney, Agent, or Firm*—Sughrue, Mion, Zinn, Macpeak & Seas, PLLC

[57] ABSTRACT

A rotary sleeve 1 is integral with a rotary polygon mirror 14 forming a rotor section, one end portion of the rotary sleeve is formed into a magnet mounting section 15, on which a magnet yoke 3 and rotary magnets 4 are mounted. The rotary sleeve 1 has a bearing on its inner cylindrical surface 17 which is in the form of a through-hole.

7 Claims, 2 Drawing Sheets

ROTARY POLYGON MIRROR MOTOR

BACKGROUND OF THE INVENTION

1. Field of the Invention

This invention relates to a rotary polygon mirror motor adapted to cause a laser beam to scan a given object at high speed and with high accuracy.

2. Description of the Related Art

In a laser printer or the like, a rotary polygon mirror motor adapted to rotate a rotary polygon mirror to cause a light beam to scan a given object, must be rotated at a high speed of several thousand revolutions per minute to several ten thousand revolution per minute with high accuracy. Especially, the flatness and the surface inclination of the rotary polygon mirror, and the vibration of the motor greatly affect the printing quality.

FIG. 3 is a vertical sectional view of a conventional rotary polygon mirror motor. In FIG. 3, reference numeral 1 designates a rotary sleeve; 2, a rotary polygon mirror which is secured to the rotary sleeve 1 through a cap 19 with screws 10. The mirrors of the rotary polygon mirror 2 (hereinafter referred to as "a rotary polygon mirror unit", when applicable) 2 are mirror-finished. The seat 2A of the rotary polygon mirror unit 2 which is mounted on the rotary sleeve 1 affects the surface inclination, and therefore its squareness with respect to the central axis of the rotary sleeve 1 is maintained considerably high in accuracy. Further in FIG. 3, reference numeral 3 designates a magnet yoke fixedly mounted on the rotary sleeve 1; and 4, rotary magnets. In general, in order to cause the magnetic flux of the rotary magnets to flow in the magnet yoke 3, the latter is made of a material such as iron which is high in magnetic permeability. The magnetic flux of the rotary magnet 4 is allowed to flow through stator cores 5 secured to a housing 9. Coils 6 are wound on the stator cores 5. The polarity of each of the rotary magnets 4 is detected with a Hall element 8 mounted on a base board 7. That is, the motor is an inner rotor type motor in which current is applied to particular coils to obtain torque.

The housing 9 has a stationary shaft 11 at the center, and has a particular groove pattern in the outer cylindrical surface, thus forming an air bearing with a gap of several microns ($\mu$m) to several tens of microns ($\mu$m) between the outer cylindrical surface thereof and the inner cylindrical surface of the rotary sleeve 1. In the direction of thrust of the motor, the rotary sleeve 1 is supported by the force of attraction of a thrust magnet 12 at one end of the stationary shaft 11 and another thrust magnet 13 at one end of the cap 19.

(1) In the above-described rotary polygon mirror motor, centrifugal load may act on it because of the high speed rotation, or heat may be generated therein by the windage loss thereof or by the loss of the motor. In this case, depending on the force of tightening screws which fix the rotary polygon mirror or depending on the number of the screws, the rotary polygon mirror may not be elongated uniformly in the direction of centrifugal load, or it may be elongated non-uniformly when thermally expanded. As a result, the rotary polygon mirror is greatly adversely affected in flatness or in surface inclination. Furthermore, when the rotary polygon mirror is cyclically cooled and heated, for instance the screws are loosened. As a result, the rotary polygon mirror is shifted, so that it is worsened in dynamic balance, thus being vibrated. That is, its rotation is unstable.

(2) Another adverse effect due to the generation of heat is as follows: When the thermal expansion coefficient of the magnet yoke attached to the rotary sleeve is smaller than that of the rotary sleeve, the thermal expansion of the rotary sleeve due to the generation of heat is suppressed by the magnet yoke. Because the rotary sleeve cannot deform outward, the inner surface of the rotary sleeve forming a bearing is deformed, so that it may be brought into contact with the stationary shaft. This fact limits the use of material for formation of the rotary sleeve.

(3) In forming the mirrors of the rotary polygon mirror unit, the mirrors are piled up and finished for the purpose of reduction of the manufacturing cost. The seat of the rotary sleeve through which the latter is set in the rotary polygon mirror, must be machined in such a manner that its squareness with respect to the rotary shaft is considerably high in accuracy; otherwise, during the rotation of the rotary polygon mirror, the latter is greatly adversely affected in surface inclination. In order to overcome this difficulty, in machining the seat, a method is employed in which, with the bearing and the motor section assembled, the assembly is rotated with its own thrust. However, this method is disadvantageous in that the bearing may be scratched.

SUMMARY OF THE INVENTION

This invention has been made to eliminate the above problems, and therefore an object of the invention is to provide a rotary polygon mirror motor having a rotary sleeve and a rotary polygon mirror formed monolithically as one unit with one and the same aluminum alloy, thereby preventing the worsening of the dynamic balance thereof.

Another object of the invention is to provide a rotary polygon mirror motor in which a part of the outer cylindrical surface of the rotary sleeve is formed into a magnet mounting section, and a magnet yoke and rotary magnets are attached to the magnet mounting section, to prevent the deformation of the rotary sleeve which otherwise may occur when the rotary polygon mirror is thermal expanded.

Still another object of the invention is to provide a rotary polygon mirror motor in which the rotary sleeve has an inner cylindrical surface which is in the form of a vertical through-hole so that the mirror surface section can be machined without damage of the bearing.

BRIEF DESCRIPTION OF THE DRAWINGS

The above and other objects, features, and advantages of the present invention will be apparent when carefully reading the following detailed description in connection with the accompanying drawings, in which.

DETAILED DESCRIPTION OF THE PREFERRED EMBODIMENTS

A description will be given in more detail of preferred embodiments of this invention with reference to the accompanying drawings.

A rotary polygon mirror is different from the above-described conventional one in the arrangement of the rotary section of its motor.

Figure 1:
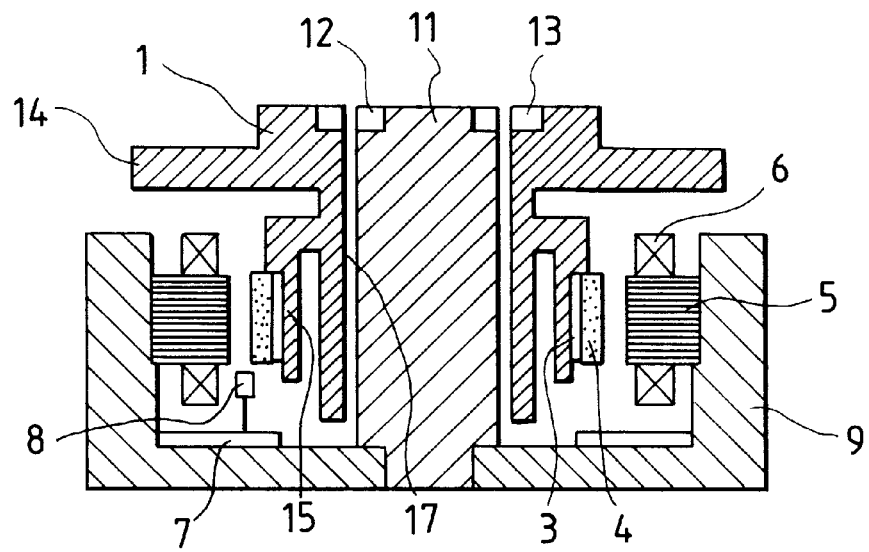
FIG. 1 is a vertical sectional view of a rotary polygon mirror motor according to an embodiment of the invention.

FIG. 1 shows the embodiment of the invention. A rotary sleeve 1 has a polygon mirror 14 at one end; that is, the rotary sleeve 1 is integral with the polygon mirror 14. The rotary sleeve 1 including the polygon mirror 14, is made of a pure aluminum which is high in machinability, and scarcely forms a cavity when molded. A part of the rotary sleeve 1 is formed into a magnet mounting section 15, to which rotary magnets 4 and a magnet yoke 3 are secured. The inner cylindrical surface 17 of the rotary sleeve is a bearing surface, which is vertically extended. In addition, a thrust magnet 13 is attached to the inner cylindrical surface of the rotary sleeve, while another thrust magnet 12 is secured to the stationary shaft 11. That is, by the magnetic attraction force of thrust magnets 12 and 13, the rotary sleeve is held in the direction of thrust. The inside diameter of the thrust magnet 13 is equal to or larger than the bearing's inner cylindrical surface.

In this embodiment, the rotary sleeve is monolithically integral with the rotary polygon mirror, and therefore it is unnecessary to secure the rotary polygon mirror to the rotary sleeve with screws or the like. This feature minimizes the deformation of the mirror surface section or the worsening of the dynamic balance thereof which is due to the centrifugal load when the rotary polygon mirror is rotated at high speed or generates heat, and the worsening of the flatness, the surface inclination accuracy, or the vibration of the mirror surface section.

The magnet yoke 3, which is made of iron or the like low in thermal expansion coefficient, is secured to the magnet mounting section 15. Therefore, even if the thermal expansion of the magnet mounting section is suppressed which is due to the heat generated when the rotary polygon mirror is rotated at high speed, deformation occurs with the magnet mounting section 15 only, and the inner cylindrical surface of the rotary sleeve is scarcely affected thereby. Hence, the rotary sleeve is never brought into contact with the stationary shaft; that is, it is rotated stably at all times.

Figure 2:
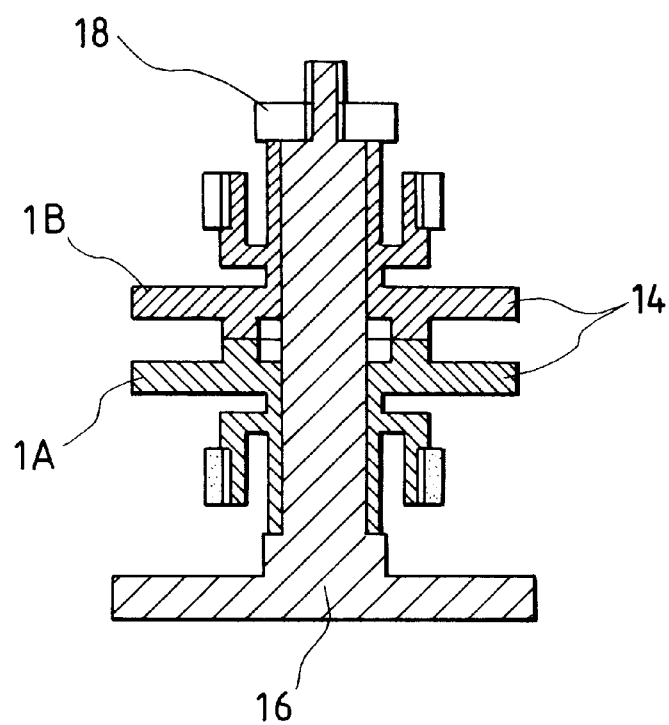
FIG. 2 is a vertical sectional view showing a mirror finishing method for the manufacture of the rotary polygon mirror motor according to the invention.
Figure 3:
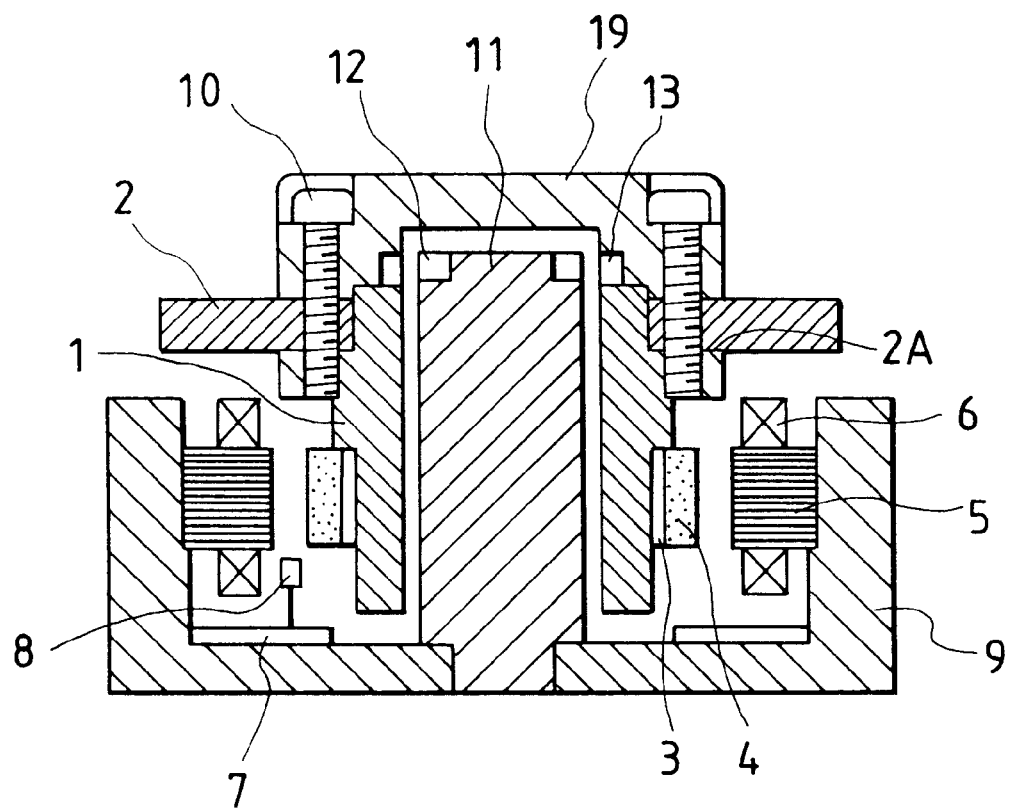
FIG. 3 is a vertical sectional view of a conventional rotary polygon mirror motor.

FIG. 2 shows a method of mirror-finishing the polygon mirrors 14 shown in FIG. 1. In FIG. 2, reference numeral 16 designates a shaft which forms no gap with the inner cylindrical surface 17 of the rotary sleeve 1. Two rotary sleeves 1A and 1B are put on the shaft 16 in such a manner that they oppose each other, and their polygon mirrors 14 to be mirror-finished are in alignment with each other. The two rotary sleeves 1A and 1B are tightened with a nut 18. Under this condition, the assembly is set on a mirror-finishing machine.

In this embodiment, the rotary sleeve 1 has the bearing's inner cylindrical surface in the form of a vertical through-hole. Therefore, two rotary sleeves can be mounted on the shaft 16 in such a manner that they oppose each other. Accordingly, the two rotary sleeves can be subjected to mirror-finishing at the same time. The surface inclination of the mirror surface section with respect to the rotary shaft is sufficiently high in accuracy, because the rotary sleeve is fixed with respect to the inner cylindrical surface 17 which forms the bearing of the rotary sleeve. In addition, the bearing is never scratched.

In the above-described embodiment, the motor is of an inner rotor type; however, it goes without saying that the technical concept of the invention is equally applicable to an outer rotor type motor, or a flat type motor.

In the rotary polygon mirror motor of the invention, the rotary sleeve and the rotary polygon mirror are monolithic, i.e., provided as one unit. Therefore, the motor of the invention is free from the difficulty that the rotary polygon mirror is off-centered when mounted. This feature minimizes the initial unbalance thereof. Furthermore, since the rotary polygon mirror is not fixed with screws, even when the rotary polygon mirror is rotated at high speed, the polygon mirror is maintained high in surface accuracy, and the dynamic balance is extremely minimized in variation. In addition, the number of components is reduced, and the number of assembling steps is also decreased.

The provision of the magnet mounting section has the following effect: Even when the magnet yoke and rotary magnet mounting section are deformed by thermal expansion due to the generation of heat, the bearing section is hardly affected thereby.

Furthermore, in the rotary polygon mirror motor of the invention, the rotary sleeve has the bearing's inner cylindrical surface which is in the form of a vertical through-hole. Hence, in machining the mirror surfaces, the bearing's inner cylindrical surface will never be scratched, and two mirror surface sections can be obtained at the same time. Therefore, the surface inclination is maintained high in accuracy, and the number of machining steps is greatly reduced.

Thus, the rotary polygon mirror motor of the invention is low in manufacturing cost, stable in quality, and high in accuracy.

While a specific embodiment has been described, it should be understood that the present invention is not limited to that embodiment, but may variously be modified, altered and changed within the scope of the present invention.

What is claimed is:

1. A rotary polygon mirror motor, comprising:

a stator section including stator cores and a stationary shaft;

a rotor section including a rotary polygon mirror having a plurality of reflecting mirror surfaces in an outer periphery thereof, and a rotary sleeve to which a magnet yoke adapted to support rotary magnets is secured; and a bearing through which said rotary sleeve of said rotor section is supported on said stationary shaft;

wherein said rotary sleeve and said rotary polygon mirror are formed as one body with one aluminum alloy.

2. A rotary polygon mirror motor as claimed in claim 1, wherein a part of the outer cylindrical surface of said rotary sleeve is formed into a magnet mounting section so that said rotary magnets are arranged cylindrically.

3. A rotary polygon mirror motor as claimed in claim 2, wherein said rotary sleeve has an inner cylindrical surface which is formed as a vertical through-hole.

4. A rotary polygon mirror motor as claimed in claim 2, wherein said magnet mounting section is radially spaced from said rotary sleeve by a gap.

5. A rotary polygon mirror motor as claimed in claim 1, wherein said rotary sleeve has an inner cylindrical surface which is formed as a vertical through-hole.

6. A rotary polygon mirror motor, comprising:

a stator section including stator cores and a stationary shaft;

a rotor section including a rotary polygon mirror having a plurality of reflecting mirror surfaces in an outer periphery thereof, and a rotary sleeve to which a magnet yoke adapted to support rotary magnets is secured; and a bearing through which said rotary sleeve of said rotor section is supported on said stationary shaft;

wherein said rotary sleeve and said rotary polygon mirror are monolithically formed of aluminum alloy.

7. A rotary polygon mirror motor as claimed in claim 6, further comprising a cylindrical magnet mounting section monolithically formed with said rotary sleeve and said rotary mirror, wherein said magnet mounting section is radially spaced from said rotary sleeve by a gap.

* * * * *